July 24, 1928.  
J. H. TANN  
1,678,366  
VEHICLE SIGNAL  
Filed Dec. 28, 1926  
2 Sheets-Sheet 1
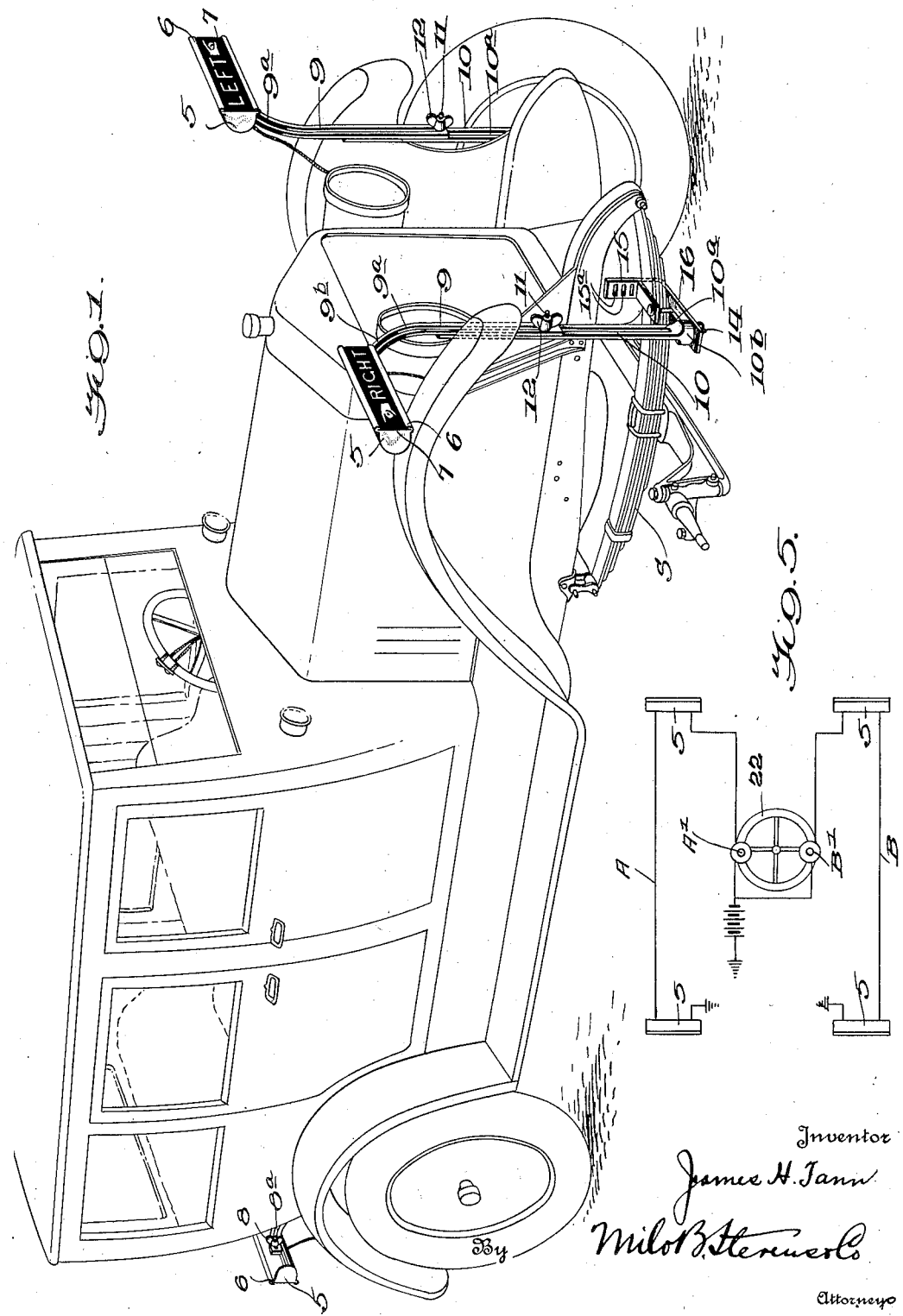

July 24, 1928.
J. H. TANN
VEHICLE SIGNAL
Filed Dec. 28, 1926
1,678,366
2 Sheets-Sheet 2
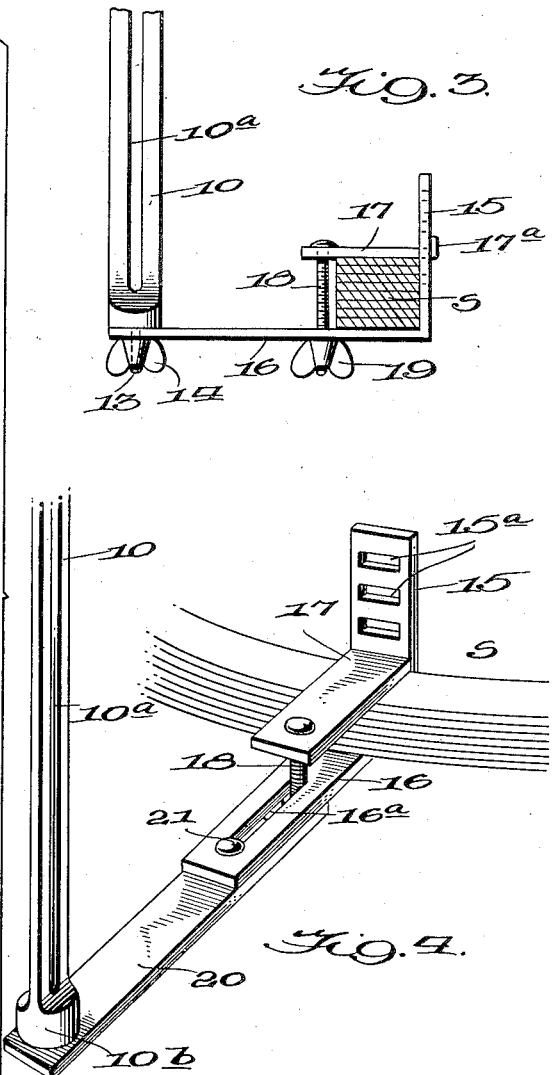
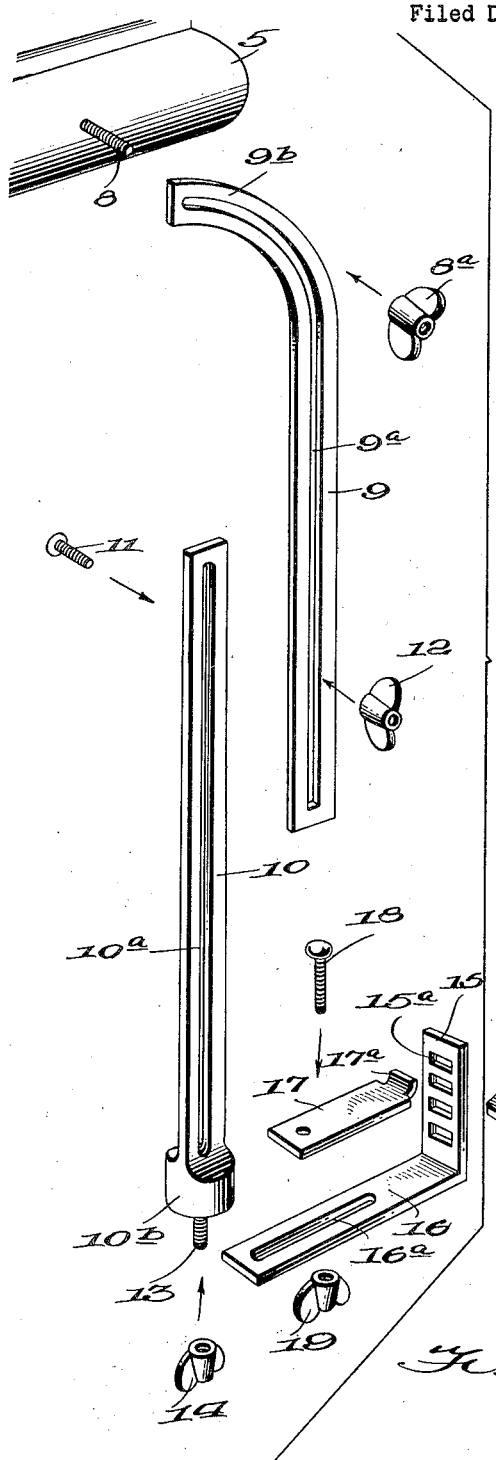
Inventor
James H. Tann
By Milo B. Stevens Co.
Attorneys Patented July 24, 1928.

1,678,366

UNITED STATES PATENT OFFICE.

JAMES H. TANN, OF LANSING, MICHIGAN.

VEHICLE SIGNAL.

Application filed December 28, 1926. Serial No. 157,560.

My invention relates to vehicle signals, having for its primary object the provision of a signal of this kind having an adjustable mounting means whereby it may be readily attached to different types of vehicles without the exercise of unusual skill, and arranged in different positions to suit a particular vehicle construction so as not to detract from the appearance of the vehicle.

Another object of the invention is to provide a direction indicating signal of this character, applicable to each side of the vehicle at the front and rear, whereby approaching and following vehicles may be readily and seasonably apprised of any turn which the driver may contemplate.

The invention also contemplates a signal, as characterized, which will be neat in appearance, relatively inexpensive of manufacture, and highly efficient in practical use.

The foregoing and other objects are attained by means of a novel combination and arrangement of parts to be hereinafter described and claimed and in order that the same may be better understood, reference is had to the accompanying drawings forming a part of this specification. The drawings illustrate what I now regard as a preferred embodiment of the invention, but it is to be understood that various changes and modifications thereof will immediately suggest themselves to those skilled in the art without departing from the spirit and scope of the subject matter as claimed.

In the drawings, wherein the same reference characters designate the same parts in all views, Figure 1 is a perspective view of an automobile showing the application of my invention thereto;

Figure 2 is a group perspective view of the parts of the device disassembled;

Figure 3 is a front elevation partly broken away;

Figure 4 is a perspective view of a slightly modified form of the invention, and Figure 5 is a wiring diagram.

Referring specifically to the drawings, 5 denotes a signal housing of the illuminated lamp box type having its open front provided with guide ways 6 for an inscription bearing plate 7 of transluscent material. From the back of the housing there projects a threaded stud 8 insertable in a slot $9^a$ of one section 9 of an extensible standard. A wing nut $8^a$ serves to clamp the housing 5 to standard section 9 in a predetermined position, it being noted that prior to tightening nut $8^a$, housing 5 may be swung about stud 8 as an axis to an angular position to rest upon a fender, or to clear adjacent parts of the vehicle, and to permit the housing to be accommodated in a comparatively small space.

In the preferred embodiment of the invention the vehicle is shown as being provided with four housings 5, there being two on each side, one in front and one in the rear. The housings are each supported by extensible standards preferably formed of flat metal sections 9 and 10. The upper standard section 9 has heretofore been described as being longitudinally slotted as at $9^a$, and the lower standard section 10 is also longitudinally slotted as indicated at $10^a$. The two standard sections are extensibly connected by one or more clamp bolts 11 provided with wing nuts 12. It will be evident that sections 9 and 10 may be angularly disposed if desired. The construction of the standards is identical in each instance. Referring to the standard section 9 it is observed that its upper end is curved as at $9^b$. By this arrangement it is possible to secure a lateral adjustment of the housing 5 with respect to the major portion of the standard. Longitudinal or vertical adjustment of the housing 5 is had by relative longitudinal movement of the sections 9 and 10. This matter of lateral adjustment becomes highly important in applying the signal to different makes of cars.

The lower end of the standard section 10 terminates in a disk-like enlargement $10^b$ from which projects a fixed axial stud 13 provided with a wing nut 14 whereby the standard may be clamped to a support.

The supporting means for the standards 9, 10 at the front and rear of the vehicle differs slightly. However, in each instance an L-bracket is provided having its short vertical arm 15 formed with a plurality of spaced transverse slots $15^a$; and its long horizontal arm 16 cut with a longitudinal slot $16^a$. This L-bracket 15, 16 is clamped to the front and rear vehicle springs S by means of a short metal plate 17 having its reduced end $17^a$ selectively insertable in the slots $15^a$. A bolt 18, insertable through a hole in the plate 17 and through the slot 16ᵃ of the L-bracket arm 16, has a wing nut 19 whereby the opposed inner faces of arm 16 and plate 17 may be caused to tightly embrace the vehicle springs S as shown in the drawings.

In applying the signal housings to the front of the vehicle the disk-like enlargement 10ᵇ of the lower standard section 10 is supported and clamped upon the long horizontal bracket arm 16, the axial stud 13 extending through the slot 16ᵃ thereof. In view of the fact that tire carriers, trunks or the like are commonly carried at the rear of the vehicle it is usually necessary that the standard be clamped to a longitudinally slotted bar 20 extensibly carried by the bracket arm 16 and connected thereto by means of one or more bolts 21. The use of the extensible bar 20 enables the standard to be mounted rearwardly of the tire carrier, trunk or the like so that the signal housing will be clearly visible.

It is believed to be obvious that each standard 9, 10 can be rotated upon loosening the wing nut 14 on stud 13. This is a very important point, since it is often necessary to rotate the standard slightly in order to get the housing in just the exact position desired. From the structure just described and that referred to earlier in the specification, it is evident that the housing 5 is made universally adjustable.

The pair of housings at the right hand side of the vehicle have their plates 7 suitably inscribed to indicate a right hand turn; and those at the left hand side to indicate a left hand turn. Each housing as already intimated is provided with a receiving socket for an electric light bulb. There are two electrical circuits provided, one for the left hand housings and the other for the right hand housings, these circuits being denoted at A and B, respectively. Circuit A has a control switch A' and circuit B has a control switch B'. The control switches A' and B' are mounted on the steering wheel 22 as shown so that the driver can close either switch to indicate a contemplated turn without the necessity of removing his hands from the wheel.

Having thus described my invention, what I claim as new and desire to secure by Letters Patent is:

A signal casing support for automobiles and the like comprising a stud attached to the casing, an extensible and angularly adjustable standard comprising longitudinally slotted sections in flat contact with each other, clamp bolts and nuts associated with the slots of said sections whereby the same may be retained in a predetermined adjusted position, the upper standard section terminating in a laterally directed branch the slot of which rotatably receives said casing carrying stud whereby the signal element can be adjusted rotatably and transversely of the axes of said standard while the sections thereof are alined, the lowermost standard section having its lower end formed with an enlarged flattened base portion, a threaded axially extending stud projecting from said base portion and having a clamp nut, and a slotted horizontal support having means for attachment to the vehicle and upon which said standard is mounted for rotatable and horizontal adjustment by means of its stud and clamp nut.

In testimony whereof I affix my signature.

JAMES H. TANN.